3,335,603
GRIPS FOR TESTING MACHINE
Martin M. Gram, St. Paul, Minn., assignor, by mesne assignments, to MTS Systems Corporation, a corporation of Minnesota
Filed Mar. 17, 1965, Ser. No. 440,389
5 Claims. (Cl. 73—103)

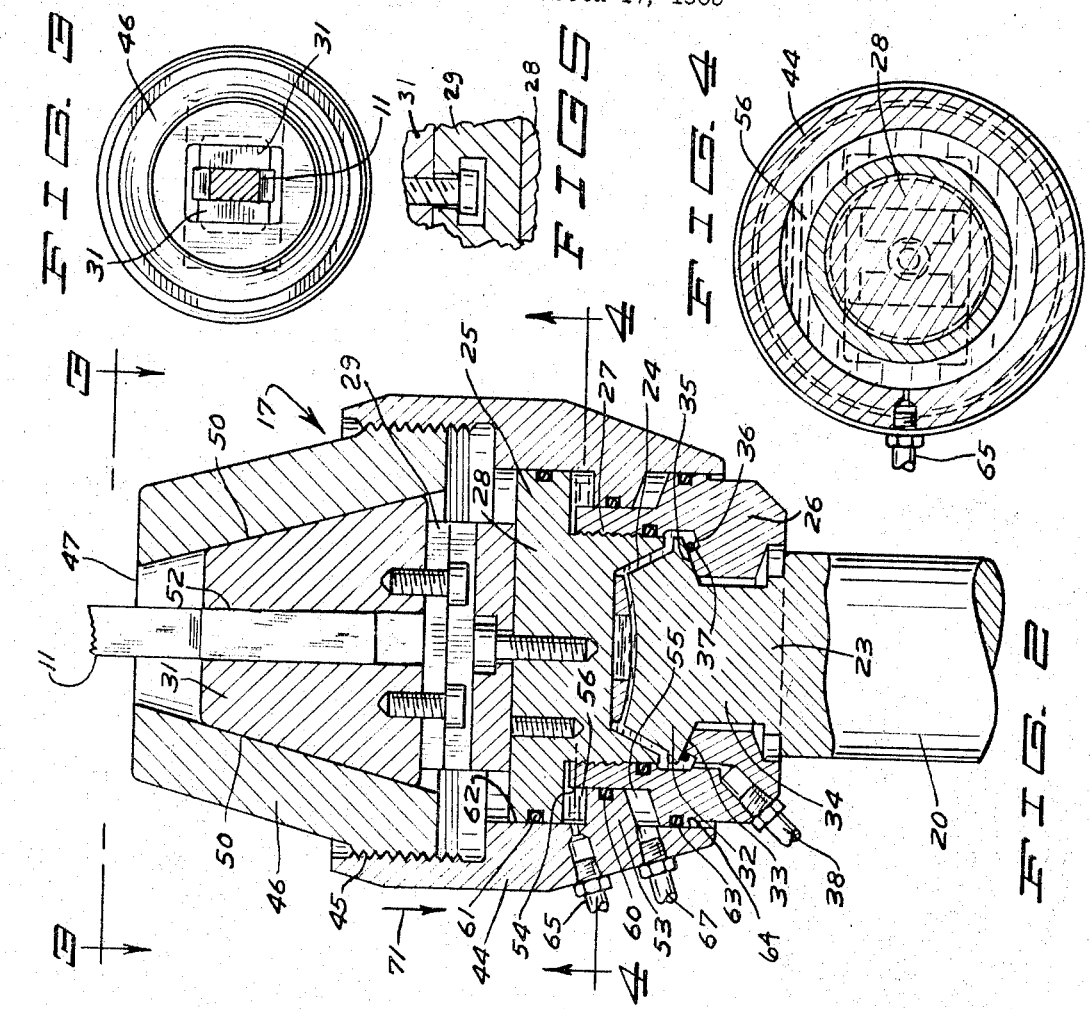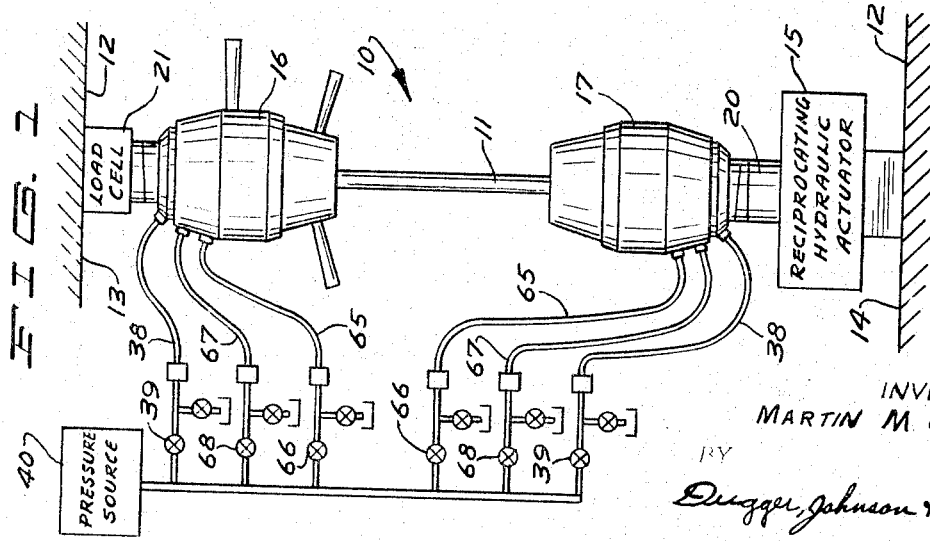

The present invention relates broadly to tension and compression testing machines, and more particularly to an improved gripping device for machines of the type which will maintain a constant preload on the specimen as the instantaneous load is varied.

Tests involving repeated application of stress, called fatigue tests, are usually performed by cyclic compression and tension. The results of these tests are used to arrive at stress-strain diagrams that in turn reflect the elastic and plastic behavior of the metal. With most types of testing machines, the grips which hold the specimen are designed for either tension testing or compression testing, but not both. These devices are not suitable for tensioning-compression testing because misalignment and movement errors are introduced as the instantaneous stress load passes through "zero." To overcome this problem, various grips have been designed which apply an initial preload or squeeze load for the purpose of securely holding the specimen in the machine, irregardless of the magnitude or direction of the instantaneous stress load. One such grip is the wedge type wherein the squeeze applied to the test specimen is proportional to the amount with which a pair of gripping wedges or jaws are forced into a wedge chamber. Although the wedge type grip has been widely used in industry and research, very definite limitations have been imposed upon it because of its inability to maintain the preload at a constant value while the instantaneous load is varied, especially when cyclic loads of high magnitude are applied.

The problem of maintaining a constant preload in the wedge type grip is especially acute because a portion or component of the cyclic load is invariably transmitted to the gripping jaws as a result of the force transmitting relationship of the jaws to the parts of the machine that apply the cyclic load. In other words, the physical relationship of the parts is such that the gripping jaws are not insulated from loads or forces occurring in the rest of the machine and consequently components of the axial loads are improperly transmitted so as to vary the initial preload applied to the test specimen, in the wedge grips now available.

The present invention represents a solution to this problem, i.e. it provides a wedge type grip that applies a preload that remains constant during cyclic loading of the test specimen. The rest of the testing machine itself can be of any preferred design and, as shown in the example, includes a spherically seated alignment head of the type more fully disclosed in my co-pending application Ser. No. 403,213, filed Oct. 12, 1964, for Hydraulic Alignment Head for Specimen Testing.

It is therefore the principal object of the present invention to present a specimen grip preloading device for use with specimen grips that does not change the preload or squeeze load on the specimen during cyclical loading of the specimen.

Other objects of this invention will become apparent as the description proceeds.

In the drawings,

FIG. 1 is a schematic representation of a specimen testing machine utilizing the grips made according to the present invention;

FIG. 2 is an enlarged vertical sectional view of one of the specimen grips of the device of FIG. 1;

FIG. 3 is a view taken as on line 3—3 in FIG. 2;

FIG. 4 is a sectional view taken as on line 4—4 in FIG. 2; and

FIG. 5 is a fragmentary sectional view showing a T slot for holding gripping jaws in place.

Referring to the drawings and the numerals of reference thereon, a testing machine is illustrated generally and schematically at 10. The machine 10 can be of any suitable design for testing the specimen 11, as shown. A suitable testing machine is Model 301.03 manufactured by Research Incorporated, Minneapolis, Minn. The machine has a unitary main frame 12, which is shown as upper and lower sections 13 and 14, respectively. Further provided is a reciprocating hydraulic actuator 15 mounted to the frame and it operates to apply alternate tension and compression loads to the specimen 11 through the upper and lower specimen grips 16 and 17, respectively. The lower specimen grip 17 is attached to the reciprocating hydraulic actuator 15 through an adapter member 20 and the upper specimen 16 is attached to a load cell 21 which in turn is attached to the upper frame section 13. The load cell 21 is utilized for measuring the load applied by the reciprocating actuators through the specimen and with suitable circuitry (not shown) the load can be recorded on a continuous basis if necessary. The load cell is also a commercially available unit and in use with testing machines presently on the market. The machine frame and load cell as well as the hydraulic actuator form no part of this invention and thus will not be described in great detail. These component parts can be of any suitable design within the selection of the person doing the testing.

The grip made according to the present invention is best shown in the cross sectional view of FIG. 2. Adaptor 20 is part of a piston member 23 that fits within a chamber 24. The chamber 24 is defined in a load transfer assembly 25. The load transfer assembly 25 includes an outer sleeve 26 which is threadably mounted as at 27 to an inner member 28. In turn, wedge jaws (two as shown) 31 are attached directly to an adapter member 29 through suitable cap screws which are transversely slidably mounted in a T shaped slot in the adapter member 29. The T shaped slot permits the jaws to slide transversely. The adapter 29 is also fastened to the member 28 with cap screws. There is a solid connection between the wedge jaws and the inner member 28 for transmission of compression loads. There is also a mechanical connection between the threads 27 and the sleeve 26.

The piston 23 has a head member 32 which has a spherically shaped annular surface 33 surrounding the shank portions 34 thereof. The head member surface 33 mates with a complemental surface 35 on sleeve member 26. In addition, an O-ring 36 is placed inside the chamber 24 and rests on a conical surface 37 which joins the concave spherical surface 35 and seats against the outer edge portions of the convex spherical surface 33 on the head member 32 of the piston 23.

The two spherical surfaces 35 and 33 which mate are the points of load transfer between the adaptor 20 and the load transfer member 25. The seats are spherical to permit perfect alignment between the adaptor 20 and the grip for holding the specimens. Accordingly, there is no unwanted bending moment imposed upon the specimen being held in the grip.

In order to hold the head member 32 against the seat 35 on sleeve 26, chamber 24 is hydraulically pressurized through a conduit 38 which in turn opens to a valve 39 that is connected to a suitable high pressure source 40. Once the specimen is positioned in the grip and the unit is perfectly aligned, the pressure is introduced into the chamber 24 and this forces head member 32 in a direction so that the surface 30 seats against the surface 35 and will be held in this position throughout the time the unit is being cycled. The pressure inside chamber 24 is sufficiently high to insure that the seat 33 and the seat 35 do not separate during use.

The action of this piston and its seat in alignment is more fully explained in the aforementioned co-pending patent aplication, Ser. No. 403,213.

The load transfer member 25 is surrounded by a cylinder or sleeve 44 that is threadably attached as at 45 to a grip end 46 that has a wedge chamber 47 defined therein. The wedge chamber 47 is of size and shape to receive the wedge jaws 31. Note that the wedge jaws 31 are designed to have a flat wedging surface 50 that registers with the interior of the wedge chamber 47. The specimen 11 has an enlarged end section 52 that is positioned between the two jaws 31.

The jaws 31 can slide toward and away from each other slightly as the surfaces of wedging chamber 47 act on the surfaces 52 of jaws 31.

As shown, the cylinder or sleeve 44 fits over the load transfer member 25. The sleeve 26 has a smaller outside diameter adjacent the inner end thereof so that a recess is formed between the sleeve 44 and the outer surface of the sleeve 26. Sleeve 44 has an annular internal ring 53 that fits against the outer surface 54 of the inner end of sleeve 26 and divides the recess into two chambers, i.e., a first lower chamber 55 and a second upper chamber 56.

An O-ring 60 is placed in a provided groove on the internal surface of the ring 53 and slides against the surface 54 of the sleeve 26 to seal the two chambers 55 and 56 from each other.

Further, an O ring 61 is mounted in the inner member 28 around the outer periphery thereof and seals on the upper inner surface 62 of sleeve 44. There is also an O ring 63 mounted in a provided groove around the periphery of the sleeve 26 and positioned so that it will seal against the lower inner surface 64 of the cylinder or sleeve 44.

As can be seen, the cylinder 44 and grip end 46 slide as a unit with respect to the load transfer assembly 25. In order to control the movement, pressure is admitted into the chambers 55 and 56. A conduit 65 is open to the chamber 56 and is connected through a valve 66 and other suitable conduits to pressure source 40. A conduit 67 is open to the chamber 55 through the wall of the cylinder 44 and is connected to a valve 68 that in turn is connected through a suitable main conduit to the pressure source 40. When fluid under pressure is introduced into the upper chamber 56 through conduit 65 and the pressure is released from the lower chamber 55 the sleeve or cylinder 44 and the wedge grip end 46 will move downwardly in the direction as indicated by arrow 71 with respect to the load transfer member 25. Alternately, if the pressure is released from the chamber 56 by opening the appropriate bleed valve shown schematically in FIG. 1, and pressure is introduced into the chamber 55 by opening the valve 68, the outer cylinder 44 and grip end portions 46 will move away from the wedge jaws 31.

As can be seen, when the unit is to be used, the jaws 31 will initially be loosened enough to permit introduction of a specimen between the two jaws. The units 44 and 46 are then threaded relative to each other until the surface 50 mates snugly against the surface of the wedge chamber 47. Then, assuming that there is no pressure in lower chamber 55, fluid under pressure will be introduced through the conduits 65 into chamber 56 and this will force the cylinder 44 in the direction indicated by arrow 71 with respect to the load transfer assembly 25 and this in turn will force the surfaces of the wedge chamber 47 against the wedging surfaces 50 of the jaws 31. The lateral or horizontal component of force from this wedging action will cause the jaws to exert a squeeze onto the end portion 52 of the specimen. The amount of force with which the specimen is squeezed is, of course, controlled by the pressure in the chamber 56.

The jaws 31 will slide transversely to grip the specimen and at the same time will be forced against the adapter member 29 very tightly in metal to metal contact. There is then a solid mechanical connection for compression loading of the specimen through load transfer assembly 25, and the adapter member 29 to the jaws 31. Further, with piston 23 locked tightly with suitable high fluid pressure, compression loads will be transferred directly to the jaws 31 through the load transfer member 25.

The pressure in chamber 56 is selected to be sufficiently high so that the total axial force (pressure times area) exerted on the sleeve 44 and grip ends 46 is greater than the maximum tension load which will be applied by the testing machine. When tension load is applied to the specimen this load is transferred from adapter 20, piston 23 and sleeve 26 to the fluid in chamber 56 and then to sleeve 44 and thus to the grips and the specimen. The preload force on the jaws is always greater than the load exerted in tension so that preload does not change under tension. Therefore, the squeeze load on the specimen does not change under tension loads. Likewise, because the compression load is transferred through the jaws 31 only and not through the grip ends and wedge chamber surfaces, the squeeze load on the jaws is not reduced when the specimen is compression loaded. This means that the preload is always constant and will not vary during operation to adversely affect test results.

Accordingly, when the cyclic load is applied through the reciprocating hydraulic actuator the compression load is transferred directly to the specimen through the mechanical connection previously explained. It does not act on the outer cylinder 44 nor the grip ends 46. In tension, the preload or initial squeeze force exerted by gripping jaws 31 remains constant because the preload force exerted in chamber 56 is selected to be greater than the tension load.

To release the gripping jaws the pressure in chamber 56 is released through the schematically shown bleed valve and pressure is introduced into chamber 55, to move the grip ends away from the jaws 31. The bleed valves for each hydraulic circuit is shown schematically.

While this invention will have most application with wedge type grips, it can also be used with other grips.

What is claimed is:

1. In combination with a load transfer assembly for applying an alternating tension and compression loading to a specimen, the improvement comprising:
   (a) gripping means including jaws for holding a specimen to be tested connected to said load transfer compressive assembly to mechanically transfer load to the specimen in a first axial direction without changing the force of the jaws on the specimen;
   (b) a locking member carried by the load transfer assembly adapted to effect movement of said jaws into locking relation with said specimen when said locking member is moved relative to said load transfer assembly;
   (c) and fluid pressure means between the load transfer assembly and locking member for causing movement of said locking member relative to said load transfer assembly including means to apply sufficient pressure to said fluid pressure means so that the total force on the locking member exceeds the tension force on the specimen, said fluid pressure means and said locking member carrying tension load to the jaws in a second axial direction.

2. The combination as specified in claim 1 wherein said jaws comprise a pair of wedges and said locking member forms an inner tapered surface adapted to collide with said jaws to move said jaws inwardly when said locking member is moved axially relative to the load transfer assembly.

3. In combination with a load transfer assembly in a testing machine for applying an alternating tension and compression loading to a specimen, the improvement comprising:
  (a) an outer sleeve member mating with the outer surface of said load transfer assembly, a fluid supporting chamber being formed between said sleeve and said load transfer assembly;
  (b) gripping means connected to said load transfer assembly so as to transfer compression load to a specimen in a first axial direction, said gripping means including jaws for holding a specimen to be tested;
  (c) a locking member movable with to said sleeve member and being adapted to effect movement of said jaws into locking relation with said specimen when said locking member is moved axially relative to said load transfer assembly;
  (d) and fluid pressure means in communication with said fluid supporting chamber for axially moving said cylindrical sleeve member relative to said load transfer assembly and thereby lock said jaws with respect to said specimen, said fluid in said chamber and said locking member transferring tension load to the jaws and the specimen held thereby in a second axial direction and means to provide sufficient pressure in said chamber so that the force on the locking member is greater than the tension force on the specimen.

4. In combination with a load transfer assembly and a testing machine for applying a load to a specimen, said assembly having an outer sleeve member, the improvement comprising:
  (a) a cylindrical sleeve member having an inner annular ring mating in concentric overlying relation with said outer sleeve member of said load transfer assembly;
  (b) a first annular fluid supporting chamber formed adjacent one side of said annular ring and interposedly situated between said cylindrical sleeve and and said load transfer assembly;
  (c) a second annular fluid supporting chamber formed adjacent the other side of said annular ring and interposedly situated between said cylindrical sleeve and said load transfer assembly;
  (d) gripping means connected to said load transfer assembly, said gripping means including jaws for holding the specimen to be tested;
  (e) a locking member connected to said sleeve member being adapted to effect inward movement of said jaws into locking relation with said specimen when said locking member is moved axially relative to said load transfer assembly, and
  (f) fluid pressure means for causing a differential end pressure between said first and second fluid supporting chambers to effect axial displacement of said locking member relative to said load transfer assembly and thereby lock said jaws against said specimen.

5. The combination as specified in claim 4 wherein said locking member is threadably mounted with respect to said cylindrical sleeve member.

References Cited
UNITED STATES PATENTS

| | | | |
|---|---|---|---|
| 2,702,929 | 3/1955 | Laddon et al. | 73—103 |
| 3,204,451 | 9/1965 | Cavanaugh | 73—103 |
| 3,224,259 | 12/1965 | De Nicola | 73—103 |

FOREIGN PATENTS 289,740  3/1953  Switzerland.

RICHARD C. QUEISSER, *Primary Examiner.*

JAMES J. GILL, *Examiner.*

J. H. WILLIAMSON, *Assistant Examiner.*